No. 896,897. PATENTED AUG. 25, 1908.
H. CRAMER.
VEHICLE WHEEL.
APPLICATION FILED DEC. 13, 1905. RENEWED MAY 27, 1908.
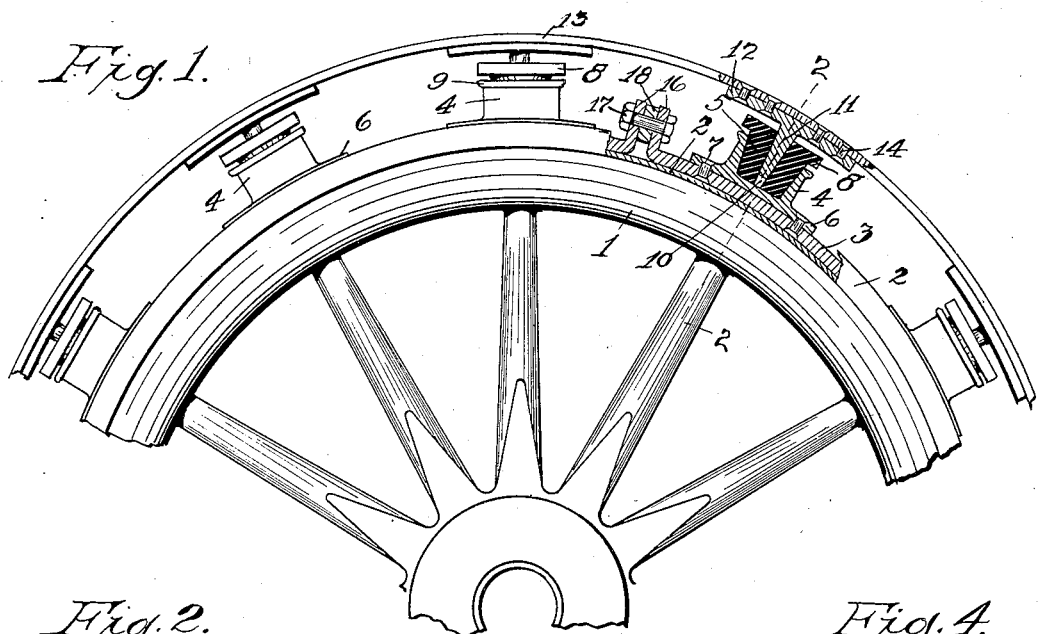
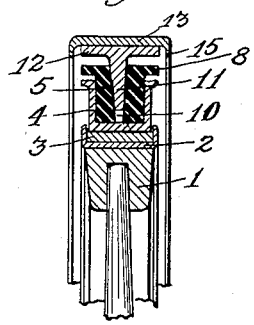
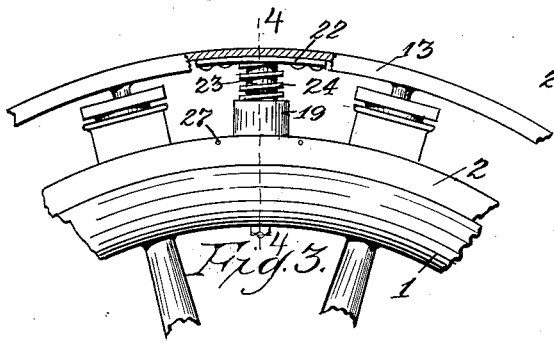
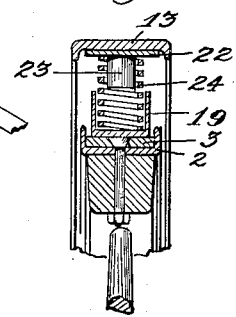
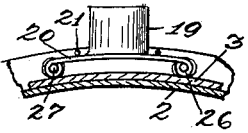
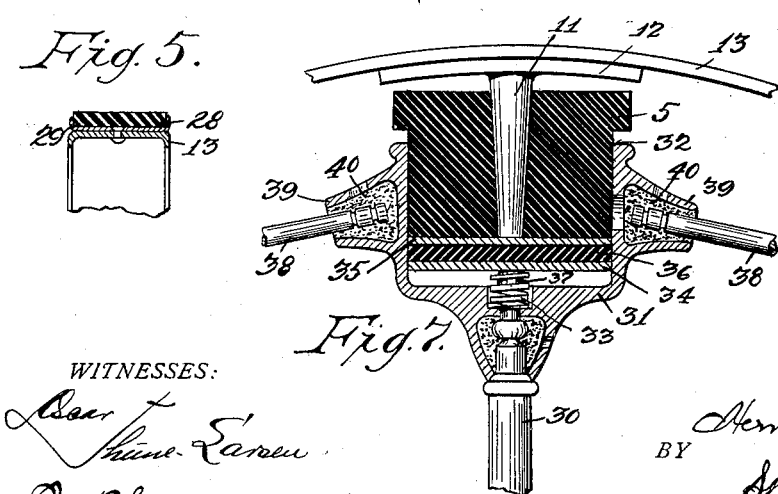
WITNESSES:
INVENTOR.
Herman Cramer
BY
Spear & Seely
ATTORNEYS.

UNITED STATES PATENT OFFICE.

HERMAN CRAMER, OF SAN FRANCISCO, CALIFORNIA.

VEHICLE-WHEEL.

No. 896,897.  Specification of Letters Patent.  Patented Aug. 25, 1908.

Application filed December 13, 1905, Serial No. 291,590. Renewed May 27, 1908. Serial No. 435,254.

*To all whom it may concern:*

Be it known that I, HERMAN CRAMER, citizen of the United States, residing at San Francisco, in the county of San Francisco and State of California, have invented certain new and useful Improvements in Vehicle-Wheels, of which the following is a specification.

My invention relates to vehicle wheels and more particularly to wheels that are to be cushioned or rendered elastic at the periphery as for automobiles, bicycles, and similar purposes.

The object of my invention is to produce a wheel in which a yielding support is provided that may be applied to the ordinary wheel in place of the usual pneumatic or solid rubber tire, or which may be formed as a part of the wheel when originally constructed. But in either case the outer tire or supporting member is at a distance from the end of the spokes, thereby forming a wheel within a wheel, and in the latter form, straight braces take the place of the ordinary fellies for giving peripheral strength to the spokes. While the tire is thus arranged at a distance from the felly, or the ends of the spokes, as the case may be, the supports therefor are of such size, shape and strength as to prevent its being carried laterally beyond the plane of the wheel even under the enormous strain that occurs when the vehicle is moving sidewise, or "skidding."

An embodiment of my invention is shown in the accompanying drawings in which:

Figure 1 is a broken side elevation of a portion of an ordinary wheel showing the manner of applying my invention thereto. Fig. 2 is a sectional view taken on line 2—2 of Fig. 1. Fig. 3 is a side elevation of a portion of the rim of a wheel showing the use of an auxiliary member for supporting the tire. Fig. 4 is a sectional view on line 4—4 of Fig. 3. Figs. 5 and 6 are detail views of slight modifications. Fig. 7 is an enlarged sectional view of one form of my invention forming a part of the wheel as originally constructed.

Referring more particularly to the drawings, 1 indicates the rim or felloes of an ordinary wheel around which is applied a band 2 of channel iron, the walls of the band being preferably substantially even with the sides of the rim. Seated within this band is a supporting or carrying band 3 upon which are seated at suitable intervals, preferably at the ends of the spokes, sockets 4, for holding blocks 5 of yielding material, as india rubber. Each of the sockets is preferably slightly tapering longitudinally and oblong or oval in cross section and provided with a flange 6 by means of which it is secured to the band 3 with suitable fasteners, as bolts or rivets 7.

Each of the blocks 5 is preferably slightly tapering to fit its socket and extends to the bottom thereof to provide the necessary resiliency to yieldingly support the vehicle. The upper portion of the block is preferably provided with a shoulder 8 that is adapted to rest on the edge or rim of the wall of the socket 4 and add its resiliency when the block is compressed, the rim being preferably flanged as at 9 to prevent excessive wear. The central portion of the block is provided with a conical perforation 10 in which is seated a tapering projection 11 on the under or inner side of a base 12, that is rigidly secured to the tire 13 by rivets 14. By tapering the projection it forms a wedge which forces the rubber against the sides of the socket and thereby utilizes the resiliency that is secured in that manner, as well as by its inward thrust or movement. The edges of the tire are preferably flanged inward as shown at 15, which adds very materially to its strength and also prevents the slipping sidewise of the bases 12 in case any of them should become loosened or broken.

The band 3 is preferably formed in sections, the ends of which are bent and turned outward as shown at 16, and secured together by a bolt 17, whereby it can be easily placed within the channel 2, or removed therefrom. A block 18, or shims or thin pieces of metal, are preferably placed between the out-turned ends 16 to give greater rigidity when the band is tightened by the bolt 17.

Additional means for resiliently supporting the tire may be employed which comprise cup-like sockets 19, each provided with a base 20 that rests upon the rim 3 and is held against displacement by the flanges of band 2. Pins 21 are preferably passed through the flanges of the band to prevent the sockets from being displaced radially. Secured to the tire directly over each socket 19, as by means of a base 22, is a pintle or projection 23 which is adapted to enter the socket 19. Seated in the socket at one end and encircling the pintle with the other, is a coil spring 24, which is adapted to normally force the tire outward, but which will be compressed when the tire is forced inward.

Instead of having the bases of the auxiliary sockets rest directly upon the band 3 they may be provided with roller bearings as shown in Fig. 6, in which the bases 20 are provided with eyes 26 as by cutting away the central portion of the end and forming the eyes therein, as by bending the remaining portions into coils, in which are rotatably mounted rollers 27. The central portion of each of the rollers is adapted to rest upon the central portion of the band and permit movement circumferentially, while lateral movement is prevented by the flanges or side walls of the band 2.

Instead of having the outer surface of the tire smooth as shown it may be corrugated in the usual manner but which is not necessary to show to give it greater tractive power, or it may be provided with a rubber facing 28 which is secured and held in place by a channel band or iron 29, as shown in Fig. 5.

In building new wheels I prefer to construct them as shown in Fig. 7, in which 30 indicates a spoke, upon the outer end of which is mounted a casting 31 having a recess or socket 32 in radial alinement with the spoke and in which is seated the block 5 of resilient material substantially the same as hereinbefore shown and described. The socket however, is deeper than the socket heretofore described, and yieldingly supported near the bottom thereof by a coil spring 33, and a plate 34, is a metallic plate 35, which is adapted to take up part of the pressure upon the tire through the projection 11, the inner end of which rests upon the plate at all times.

Seated under the plate 35 is a sheet of rubber 36, which assists in taking up the pressure when the tire is forced inward. The under surface of the plate 34 is preferably provided with a pin or projection 37 which fits within the coil of spring 33 and prevents its becoming displaced. The ends of the spokes as well as the ends of braces 38 are seated in smaller sockets 39 on the casting 31, and rigidly secured therein as by babbitting 40. This affords a very strong construction as the spokes are rigidly secured at both ends and the outer ends are as firmly held circumferentially as though they were secured by the usual fellies.

As above described my improved wheel or tire affords a strong and durable substitute for the usual yielding tire and avoids the possibility of puncture with the consequent trouble and delay of repair and inflation. When applied to the ordinary wheel it can be done as cheaply and quickly as the usual tire and when embodied in a new wheel it produces as strong a structure as the ordinary wheel and can be manufactured for less cost.

Having described my invention, what I claim as new and desire to secure by Letters Patent, is:

1. In a vehicle wheel, a socket at the outer end of each spoke, a block of rubber in each socket provided with a tapering perforation, a tire surrounding the wheel, and inwardly extending tapering projections on the tire for entering said perforations.

2. In a vehicle wheel, a socket at the outer end of each spoke, a plate in each socket, means for supporting said plate yieldingly, a block of rubber bearing on each plate, and a tire provided with means for engaging with said blocks.

3. In a vehicle wheel, a socket at the outer end of each spoke, a plate in each socket, a sheet of rubber thereunder, a plate under the sheet provided with a projection, a coil spring between the last mentioned plate and the bottom of the socket, one end of which encircles said projection, a centrally perforated block of rubber in each socket, and a tire around the wheel provided with projections for entering said perforations and resting upon the first mentioned plate.

4. In a vehicle wheel, a circumferentially channeled band, a divided band therein, sockets secured on the divided band, a block of rubber in each socket provided with a conical perforation, a tire, and inwardly extending projections thereon in position for entering said perforations.

5. In a vehicle wheel, a circumferentially channeled band, a divided band therein having its ends bent outward, means for securing said ends together, a socket on the divided band at the end of each spoke, a centrally perforated block of rubber in each socket, an inwardly flanged tire, and inwardly extending projections on said tire, one within the perforation of each block.

6. In a vehicle wheel, a circumferentially channeled band, a divided band therein, sockets secured to the divided band, a block of rubber in each socket, auxiliary yielding members seated between said sockets, and a tire surrounding and engaging with said rubber and auxiliary members.

7. In a vehicle wheel, a circumferentially channeled band, a divided band therein, sockets secured to the divided band, perforated blocks of rubber therein, auxiliary sockets seated between said other sockets, a coil spring in each auxiliary socket, a tire, and inwardly extending projections on the tire for entering said blocks and springs respectively.

8. In a vehicle wheel, a circumferentially channeled band, a divided band therein, sockets secured to the divided band, and each provided with a block of rubber, auxiliary sockets therebetween, each of which is provided with a base, pins in the walls of the channeled band over said bases, a spring in each auxiliary socket, and a tire engaging with said blocks of rubber and springs.

9. In a vehicle wheel, a circumferentially channeled band, a divided band therein, sockets secured to the divided band, and each provided with a block of rubber, auxiliary sockets therebetween, rollers in the base of each auxiliary socket, a spring in each auxiliary socket, and a tire in engagement with said blocks and springs.

In testimony whereof I have affixed my signature, in presence of two witnesses, this 27th day of November 1905.

HERMAN CRAMER.

Witnesses:
M. R. SEELY,
F. M. BARTEL.